United States Patent [19]

Champlin

[11] 3,932,345

[45] Jan. 13, 1976

[54] METHOD FOR PREPARING PIGMENTED POLYESTERS WHEREIN THE PIGMENT GLYCOL SLURRY IS PREHEATED

[75] Inventor: Roger A. Champlin, Uniontown, Ohio

[73] Assignee: The Goodyear Tire & Rubber Company, Akron, Ohio

[22] Filed: Feb. 6, 1975

[21] Appl. No.: 547,686

[52] U.S. Cl. ............................................. 260/40 P
[51] Int. Cl.² ....................................... C08L 67/02
[58] Field of Search ................................. 260/40 P

[56] References Cited
UNITED STATES PATENTS

| | | | |
|---|---|---|---|
| 2,962,466 | 11/1960 | Parnell | 260/40 P X |
| 3,002,942 | 10/1961 | Zoetbroad et al. | 260/40 P X |
| 3,275,590 | 9/1966 | Thomas | 260/40 P |

Primary Examiner—Donald E. Czaja
Assistant Examiner—S. M. Person
Attorney, Agent, or Firm—F. W. Brunner; J. P. Ward

[57] ABSTRACT

There is disclosed an improvement in the pigmenting of polyesters derived from free dicarboxylic acids and glycols employing a slurry consisting of pigmenting agent and a glycol which improvement comprises heating said slurry to a temperature ranging from about 90° C. to about 1° to 2° C. below the boiling point of the glycol constituent and adding the heated slurry to the polyester forming reactants when the temperature of said reactants ranges from about 210° to 240° C. and the pressure in the reaction vessel employed ranges from about 20 to 70 pounds per square inch gauge.

4 Claims, No Drawings

METHOD FOR PREPARING PIGMENTED POLYESTERS WHEREIN THE PIGMENT GLYCOL SLURRY IS PREHEATED

It is well known to add finely divided pigmenting agents to high molecular weight linear polyesters used in the production of fibers, the most commonly employed pigmenting agent being titanium dioxide. It is also well known that these finely divided pigmenting agents can be added to such polyesters through the use of pigment/glycol slurries. Furthermore, it is known that possibly the single most important problem associated with the pigmentation of such polyesters employing pigment/glycol slurries is the inability to achieve a uniform and homogeneous distribution of said finely divided pigments in the polyesters being pigmented. This problem is particularly prevalent in the pigmentation of high molecular weight linear polyesters derived from free dicarboxylic acids and glycols employing such slurries, especially when such slurries are added during the process of making the polyester. The problem of agglomeration of the pigment particles in this particular instance is attributed to the rather severe reaction conditions existing at the time of addition to the pigment.

Various solutions have been offered for overcoming this problem, including the use of a dispersing agent or agents in combination with the pigment/glycol slurry or the ester forming reactants employed in the production of the high molecular weight polyester. It has also been proposed to employ pigmented masterbatches wherein the pigment is dispersed in a polymeric matrix which may or may not be the same as the polyester to which the masterbatch is to be added. When the masterbatch procedure is employed the masterbatch is generally added at or near the end of the polyester forming process, i.e. at or near the end of the condensation reaction. The drawbacks to these solutions are, in the main, economic in nature. For example, in processes employing pigment/glycol slurries, the addition of dispersing agents to avoid agglomeration of the finely divided pigment particles not only adds to the cost of the final product but can also change the properties of the final product. In processes involving the use of pigmented masterbatches the preparation of the polyester matrix involves not only additional expense but also additional process steps as well.

There has now been discovered an improvement in the pigmentation of high molecular weight linear polyester derived from free dicarboxylic acids and glycols employing a pigment/glycol slurry where the slurry is added during the process of preparing said polyesters and which improvement essentially eliminates agglomeration of the finely divided pigment, thereby assuring a uniform and homogeneous dispersion of finely divided pigment in said polyester without the need of a dispersing agent and avoids the costly preparation of pigmented mastermatches. Accordingly, the present invention provides an improvement in the pigmentation of high molecular weight linear polyesters prepared by reacting a mixture of a free dicarboxylic acid and a glycol of the series $HO(CH_2)_nOH$ where n is an integer ranging from 2 to 10 in a solvent consisting of preformed molten low molecular weight polyester derived from the same free acid and glycol as the polyester being produced, said solvent having a number average molecular weight of about 300 to about 2000, at a temperature ranging from about the melting point of said solvent to about 300° C. and at a pressure ranging from about 20 to 1000 pounds per square inch gauge pressure, distilling out the water formed in the reaction at such a rate that the pressure remains constant within said range, adding a condensation polymerization catalyst and then heating and reacting the mixture at a temperature ranging from about 265° to 280° C. at a pressure of about one millimeter of mercury pressure or less until high molecular weight linear polyester having an intrinsic viscosity of at least 0.4 is formed and wherein during the course of the preparation of the high molecular weight linear polyester there is added thereto a slurry consisting of a pigmenting agent and the same glycol used in the preparation of the linear polyester, which improvement comprises heating said pigment/glycol slurry at a temperature ranging from about 90° C. to about 1° to 2° C. below the boiling point of the glycol and adding said heated pigment/glycol slurry to the reaction mixture of free dicarboxylic acid, glycol and low molecular weight linear polyester solvent when the temperature of said mixture ranges from about 210° C. to 240° C. and the pressure ranges from about 20 to 70 pounds per square inch gauge of pressure. As used throughout this specification the term "polyester" is intended to include both homopolyesters and copolyesters. The term "high molecular weight" is defined as a polyester having an intrinsic viscosity of at least 0.4 and preferably 0.6 as measured in a 60/40 phenol/tetrachloroethane mixed solvent at 30° C.

The above described process, to which the improvement of the present invention is applicable, can be operated as a batch process or a continuous process. In operating the process batchwise the weight ratio of the preformed low molecular weight polyester solvent to the total batch (acid and glycol added) will be in the range of from about 30/70 to 60/40. A ratio of 50/50 will generally be used. In certain continuous operations the ratio can be as high as 98/2 or higher. It is most advantageous, however, to operate the process on a continuous basis. When the process is operated on a continuous basis the free dicarboxylic acid and glycol are continuously added to the preformed molten low molecular weight polyester solvent prepared from the same acid and glycol, and an amount of low molecular weight polyester prepolymer product approximately equal to the acid and glycol added continuously withdrawn. The low molecular weight polyester prepolymer being continuously withdrawn is continuously transferred to a polymerization apparatus and polymerized to high molecular weight resin which is continuously withdrawn from the polymerization vessel at approximately the same rate as low molecular weight polyester prepolymer being transferred thereto.

The process to which the improvement of the present invention is applicable can be operated over a wide range of temperatures. The temperature used for the esterification reaction of the dicarboxylic acid with the glycol should be at least as high as the melting temperature of the preformed molten low molecular weight polyester solvent but not so high as to cause a large degree of degradation of said solvent which can result in a decrease in the desirable properties of the ultimate product. Thus the temperature can range from about 150° C. to about 300° C. and is preferably operated from about 220° C. to 260° C. The temperature used in the polycondensation or polymerization of the low molecular weight polyester product resulting from the esterification reaction can range from about 260° C. to 290° C., although other temperatures can also be employed in accordance with known practice.

The pressures employed in the esterification reaction of the dicarboxylic acid with the glycol, like the temperatures employed, can vary over a wide range. Thus the pressures employed in this stage of the process can range from about 20 to 1000 pounds per square inch gauge pressure and preferably from 20 to 100 pounds per square inch gauge pressure. The condensation or polymerization stage of the process is operated under reduced pressures, generally below 10 millimeters of mercury pressure and usually at or below 1 millimeter of mercury pressure.

In addition to the above pressure and temperature conditions required for the condensation or polymerization stage of the process a suitable polymerization catalyst is also required. Suitable polymerization catalysts are any of the well known catalysts used for the polycondensation of esters including antimony trioxide, zinc borate, litharge, lead acetate, magnesium oxide and the like. No catalyst is required for the initial esterification reaction although catalysts such as zinc acetate, manganese acetate and alkali metal alcoholates can be employed if desired. In addition, alkali metal salts such as sodium acetates can be employed as stabilizers if so desired. Also, the reaction is preferably carried out in the absence of oxygen with the usual known techniques.

The preformed molten low molecular weight polyester initially employed as the solvent for the esterification reaction is characterized by having a number average molecular weight ranging from about 300 to 2000. Furthermore, it can have the same number average molecular weight as the final product of the esterification reaction or it can have a different number average molecular weight, i.e., it can have a higher or lower number average molecular weight since the number average molecular weight of the final product of the esterification reaction is regulated by the amounts and ratios of the dicarboxylic acid and the glycol added to the system. The preformed molten low molecular weight polyester used as the solvent will be composed of units of the same acid and glycol that are reacted in admixture with said preformed molten low molecular weight polyester solvent. For example, if it is desired to produce pigmented polyethylene terephthalate the polyester solvent will also be comprised of terephthalic acid and ethylene glycol units. The initial preformed molten low molecular weight polyester solvent can be prepared by polymerizing the bis glycol ester or by any other well known and suitable method.

As noted earlier, high molecular weight linear polyesters prepared in accordance with the above described process can be pigmented employing either pigment/glycol slurries, pigmented masterbatches or pigment/glycol slurries wherein dispersing agents are employed. However, these methods have generally resulted in products characterized by nonuniform and nonhomogeneous dispersions of pigment particles, have proved to be disadvantageous from an economical standpoint or have resulted in products possessing poorer physical properties. Through the use of the present invention these disadvantages can be overcome as illustrated by the examples below. In the following examples all parts and percentages are by weight unless otherwise specified.

EXAMPLE 1

A. Preparation of Pigment/Glycol Slurry

A mixture consisting of 50 parts of titanium dioxide ($TiO_2$) and 50 parts of ethylene glycol were sandmilled and the resulting dispersion put through a 5 micron filtering element prior to use.

B. Preparation of Low Molecular Weight Polyester Solvent

To a jacketed stainless steel reaction vessel equipped with an agitator, vapor take off, nitrogen inlet and vent were added 129.9 parts of terephthalic acid and 52.3 parts of ethylene glycol. The reactor was then purged with nitrogen and the vent closed. Agitation and heating of the reaction mixture was then commenced under a nitrogen atmosphere, 35 pounds per square inch gauge (psig) pressure. The reaction was complete when 28.1 parts of by-product water was distilled off. The total reaction time was between 4 to 5 hours and the temperature of the molten low molecular weight polyethylene terephthalate solvent was about 270° C. at the time of completion of the reaction.

C. Preparation of Pigmented Polyethylene Terephthalate

To the above molten low molecular weight polyethylene terephthalate solvent were then added 86.6 parts of terephthalic acid, 35.5 parts of ethylene glycol, 0.015 part of sodium (as sodium acetate) and 0.004 part of phosphorous (as triethylene diphosphite). Upon the addition to and mixing of these ingredients with the low molecular weight solvent the temperature of the mixture dropped to about 217° C. At this point the pressure in the reaction vessel was increased from 35 psig to 70 psig using nitrogen gas. As soon as the pressure in the reaction vessel reached 70 psig, 0.25 part of the sandmilled and filtered $TiO_2$/ethylene glycol slurry prepared above was added to the reaction using nitrogen pressure. Prior to this addition, however, the slurry was heated to a temperature of about 162° C. After addition of the slurry the pressure was reduced to 35 psig and esterification of the terephthalic acid commenced. Once 18.75 parts of the by-product water were collected and the temperature of the reaction mixture reached 270° C., 40 percent of the mixture in this reaction vessel was transferred to a second reaction vessel. Immediately after this transfer was completed, 0.195 part of antimony (as antimony glycolate) was added to the reaction mixture and evacuation of the pressure in this vessel from atmospheric pressure to about 5.0 millimeters of mercury pressure was commenced. The time required to reach 5.0 millimeters of mercury pressure was about 115 minutes. Over this same period of time the temperature of the polymerizing polyethylene terephthalate was increased from about 260° C. to about 272° C. At the end of this time the polymerizing polyethylene terephthalate was transferred to yet a third reaction vessel wherein the pressure was reduced to about 0.2 millimeter of mercury pressure and the temperature of the polymerization mass increased to about 280° C. During this time by-product ethylene glycol was continuously removed and after 115 minutes pigmented polyethylene terephthalate having the desired intrinsic viscosity was obtained. The molten polyester was then extruded from the third reaction vessel, cooled and diced into pellets. The product was uniformly delustered and exhibited an excellent pigment dispersion. Microscopic examination of a 0.05 gram sample of the delustered polyester disclosed that there was present one $TiO_2$ particle in the 10 to 20 micron range and no particles in the 20 to 100 micron range or above.

EXAMPLE 2

Comparative Example

A second pigmented polyethylene terephthalate sample was prepared, with one exception, in the same manner as in Example 1 employing the same amounts of reactants and additions and, as closely as possible, the same pressure and temperature conditions. The one exception to the procedure employed in Example 1 was that in the present example the $TiO_2$/glycol slurry was not heated prior to its addition to the reaction mass. The final product exhibited a poorer dispersion, based on particle count, than was obtained in the product of Example 1. Upon microscopic examination there was present in a 0.05 gram sample of the product produced in this second example 6 particles in the 10 to 100 micron range with two thirds of these particles being in the 20 to 100 micron range.

EXAMPLE 3

Comparative Example

A third pigmented polyethylene terephthalate sample was prepared in the same manner as in Example 1 except that in this instance the pressure in the reaction vessel was reduced from 35 psig to atmospheric pressure, the heated $TiO_2$/glycol slurry added and the vessel immediately pressured back to 35 psig. The microscopic examination of a 0.05 gram sample of this polyester disclosed 10 particles in the 10 to 100 micron range with one tenth of these particles being in the 20 to 100 micron range.

EXAMPLE 4

Comparative Example

A fourth pigmented polyethylene terephthalate sample was prepared in the same manner as in Example 1 except here the $TiO_2$/glycol slurry was not heated and the slurry added after the pressure in the reaction vessel had been reduced from 35 psig to atmospheric pressure. After addition of the slurry the pressure in the reaction vessel was again returned to 35 psig and the reaction completed as in Example 1. Subsequent examination of a 0.05 gram sample of this polyester revealed that there were 16 pigment particles in the 10 to 100 micron range with one fourth of these particles falling within the 20 to 100 micron range. The table below contains a summary of the results obtained in the above examples.

TABLE I

| Example No. | Pressure in Reactor at Time of $TiO_2$ Addition, psig | Temp. of $TiO_2$ Slurry at Time of Addition, °C. | Pigment Particle Count, 10–100 | Particle Microns 20–100 | Size ( ) 100 |
|---|---|---|---|---|---|
| 1 | 70 | 162 | 1 | 0 | 0 |
| 2 | 70 | R.T.[b] | 6 | 4 | 0 |
| 3 | ATM[a] | 145 | 10 | 1 | 0 |
| 4 | ATM | R.T. | 16 | 4 | 0 |

[a]ATM: Atmospheric Pressure
[b]R.T.: Room Temperature

The criticality of heating the pigment/glycol slurry prior to its addition to the initial polyester forming reactants and of the temperature and pressure conditions in the reaction vessel at the time of the addition of the slurry have been illustrated above. It is readily apparent from these examples that uniform and homogeneous dispersion of the pigment in polyethylene terephthalate can be achieved through the use of the present invention. The absence of any one of the three essential conditions results in a nonhomogeneous dispersion and examples have also been included above which illustrate this point.

The invention has been illustrated above particularly with respect to the use of terephthalic acid and ethylene glycol as reactants. It can also be used to prepare polyesters from other acids and other glycols. For example, instead of terephthalic acid and ethylene glycol other acids and other glycols can be used.

Thus the invention is applicable to the preparation of polyesters and copolyesters of various dicarboxylic acids and various glycols. Representative examples of acids which can be used are aromatic dicarboxylic acids such as isophthalic acid, orthophthalic acid, p,p'-diphenyl dicarboxylic acid and 2,6-naphthalic acid; cycloaliphatic dicarboxylic acids such as hexahydroterephthalic acid; and saturated aliphatic dicarboxylic acids having from 4 to 10 carbon atoms such as succinic acid, adipic acid, sebacic acid, etc. Polyesters of other glycols can also be similarly prepared. Representative examples of such glycols are the polymethylene glycols of the series $HO(CH_2)_nOH$ where n is an integer from 2 to 10, such as ethylene glycol, propylene glycol, tetramethylene glycol, hexamethylene glycol and decamethylene glycol; the cyclohexane diols such as cyclohexane dimethanol; aromatic diols such as di-$\beta$-hydroxyethoxy benzene and 2,2-bis [4($\beta$-hydroxyethoxy)phenyl] propane and similar varieties of glycols. The invention can be used to prepare copolyesters by reacting one or more acids with one or more glycols.

The invention is especially suitable for the preparation of copolyesters of terephthalic acid such as the ethylene terephthalate-ethylene isophthalate copolyesters containing terephthalic acid as a major portion of the acid component such as the 90/10, 80/20, 70/30 and 60/40 copolyester, i.e., those copolyesters containing from 90 to 60 mol percent of terephthalic acid based on the total acid component and from 10 to 40 mol percent of isophthalic acid based on the total acid component.

While certain representative embodiments and details have been shown for the purpose of illustrating the invention it will be apparent to those skilled in this art that various changes and modifications may be made therein without departing from the spirit or scope of the invention.

What I claim is:

1. In a process for preparing uniformly pigmented polyesters formed by reacting a mixture of at least one dicarboxylic acid and at least one glycol in a solvent consisting of preformed polyester having a molecular weight ranging from about 200 to about 3000 in a reaction vessel at a temperature ranging from above the melting point of said solvent to about 300° C. and at a pressure ranging from about 20 to about 1000 pounds per square inch gauge pressure, distilling out the water formed in the reaction at such a rate that the pressure remains constant within said range, adding a condensation polymerization catalyst and then heating and reacting the mixture at a temperature ranging from about 265° to 285° C. at a pressure of about one millimeter of mercury pressure or less until high molecular weight polyester having an intrinsic viscosity of at least 0.4 is formed and wherein during the course of said process a slurry consisting of a pigmenting agent and a glycol is added to the mixture, the improvement which comprises heating the slurry to a temperature from about 90° C. to about 1° to 2° C. below the boiling point of said slurry and adding said heated slurry to the reaction mixture of dicarboxylic acid and glycol in the preformed polyester solvent when the temperature of said reacting mixture ranges from about 210° C. to about 240° C. and the pressure in the reaction vessel ranges from about 20 to about 70 pounds per square inch gauge pressure.

2. The improvement according to claim 1 wherein the dicarboxylic acid is selected from the group consisting of aromatic dicarboxylic acids and mixtures thereof and mixtures of aromatic dicarboxylic acids and saturated aliphatic dicarboxylic acids having from 4 to 10 carbon atoms and the glycol is selected from the group consisting of glycols of the series $HO(CH_2)_nOH$ where n is an integer ranging from 2 to 10 and cyclohexene diols.

3. The improvement of claim 2 wherein the aromatic dicarboxylic acid is terephthalic acid and the glycol is ethylene glycol.

4. The improvement according to claim 3 wherein the slurry consists of the pigmenting agent, titanium dioxide and the glycol, ethylene glycol.

* * * * *